(No Model.)

T. A. EDISON.
ELECTRICAL DISTRIBUTION SYSTEM.

No. 404,902. Patented June 11, 1889.

Attest:
G. W. Howard
F. H. Hall

Inventor:
T. A. Edison
by J. F. Weber
Atty

UNITED STATES PATENT OFFICE.

THOMAS A. EDISON, OF MENLO PARK, NEW JERSEY.

ELECTRICAL-DISTRIBUTION SYSTEM.

SPECIFICATION forming part of Letters Patent No. 404,902, dated June 11, 1889.

Application filed October 4, 1881. Serial No. 43,163. (No model.)

*To all whom it may concern:*

Be it known that I, THOMAS A. EDISON, of Menlo Park, in the county of Middlesex and State of New Jersey, have invented a new and useful Improvement in Electrical-Distribution Systems; and I do hereby declare that the following is a full and exact description of the same, reference being had to the accompanying drawings, and to the letters of reference marked thereon.

In my system of electrical distribution, in which the main conductors are placed in pipes or tubes and laid underground, I prefer to lay such main conductors in pairs around each block of a district and at each corner to run the tubes across the streets and connect all the positive conductors together and all the negative likewise together. From such conductors service-pipes lead into the houses which are to be supplied with current. These main conductors are connected to the central station where the electric generators are located by means of positive and negative feeding-conductors, which unite at certain points with the positive and negative main conductors. At points where intersecting main conductors are to be connected, where sections of the same mains are coupled together, where service-conductors are to run from the mains, or where feeding-conductors are to be connected to such mains, the pipes are run into junction-boxes, which are so arranged that the proper connections can be made within them.

The object of this invention is to produce a box for connecting the feeding-conductors with the mains. Each pair of main conductors, house-conductors, or feeding-conductors may be placed in a single pipe, as shown in my patent, No. 251,552, or each conductor of a pair may be placed in a separate pipe, perforated and notched washers being used to separate the conductors from the side of the pipe, and the whole being filled with a suitable insulating material, as fully set forth in the patent above referred to.

Figure 1:
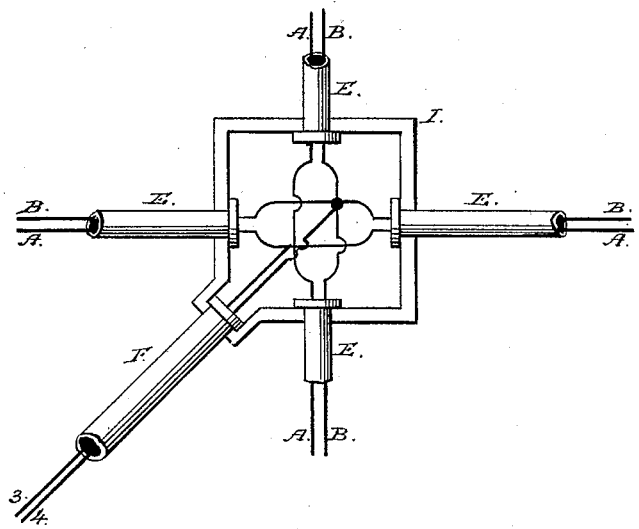
Figure 2:
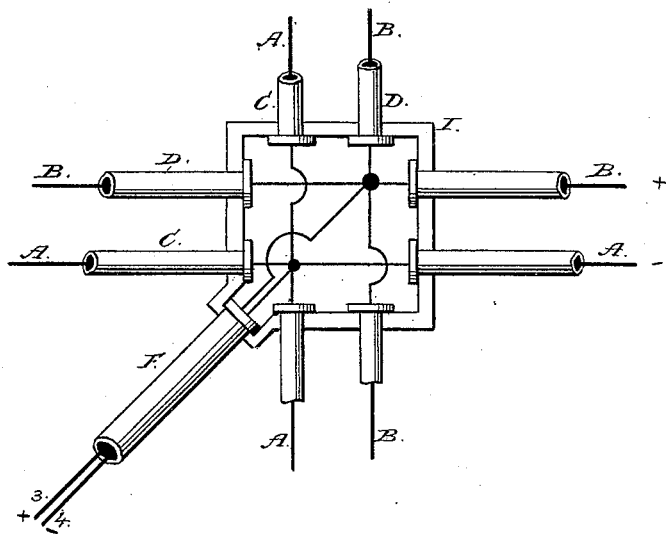

In the drawings, Figure 1 represents a corner junction-box, each pair of conductors being placed in single tubes; Fig. 2, a similar box, but with the conductors laid in separate pipes.

A A are positive, and B B negative, main conductors, the conductors of like polarity being connected together within the box I.

In Fig. 1 each pair of conductors A B is laid in a single pipe E, while in Fig. 2 the conductors are separated, conductors A being laid in pipes C and conductors B in pipes D.

3 and 4 are respectively the positive and negative feeding-conductors inclosed in a tube F, though, if desired, these conductors also could be laid in separate tubes.

The box I might be a house-service box, in which case one pair of conductors A B would run entirely through the box, while the other pair would pass only half-way through and be properly connected to the first pair; or this box might be a coupling-box for the sections of a pair of main conductors, in which case four conductors would meet in the box and be connected in pairs, while the feeding-conductors would be connected to the junctions of the positive and negative mains.

What I claim is—

1. In an underground system of electrical distribution, the combination, with a street-intersection box having pipe-openings in its sides, of two or more pairs of conductors, each pair forming the two sides of a circuit, pipes for the separate conductors entering the box, and connections within the box of conductors of the same polarity, substantially as set forth.

2. In an underground system of electrical distribution, the combination, with a street-intersection box having pipe-openings in its sides, of two or more pairs of conductors, each pair forming the two sides of a circuit, pipes for the separate conductors entering the box, connections within the box of conductors of the same polarity, and a line of conductors forming a feeding-circuit entering the box and connected to the intersecting conductors, substantially as set forth.

This specification signed and witnessed this 24th day of August, 1881.

THOMAS A. EDISON.

Witnesses:
RICHD. N. DYER,
H. W. SEELY.